Oct. 18, 1932. W. M. FULTON 1,882,798
MANUFACTURE OF TUBULAR CORRUGATED METAL WALLS
Original Filed Jan. 14, 1922
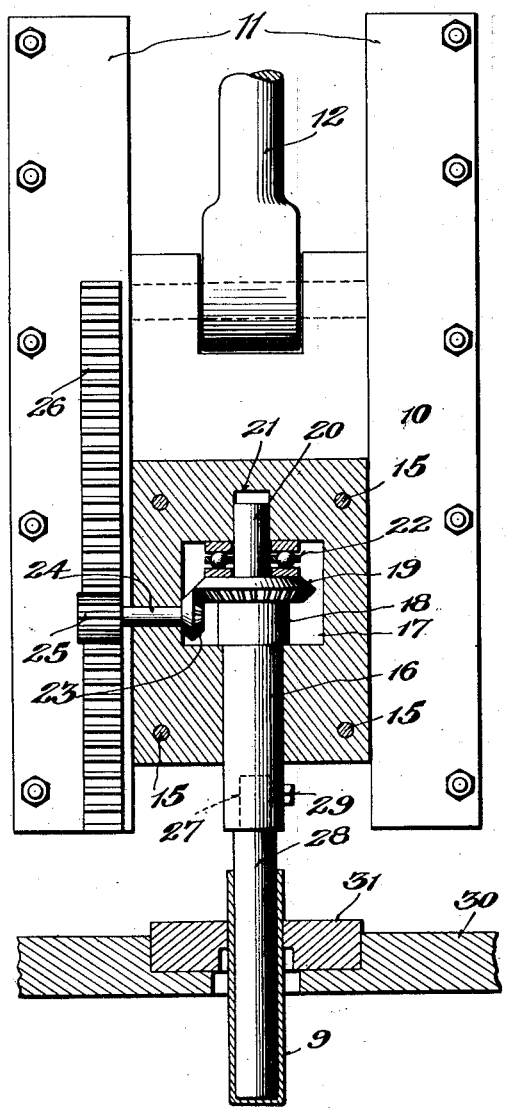
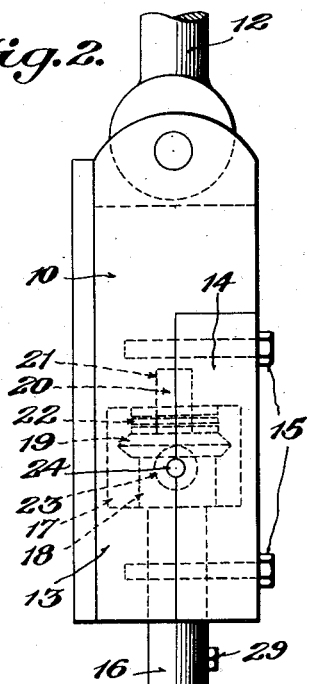
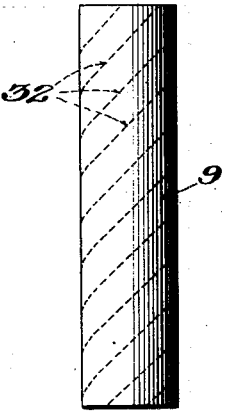
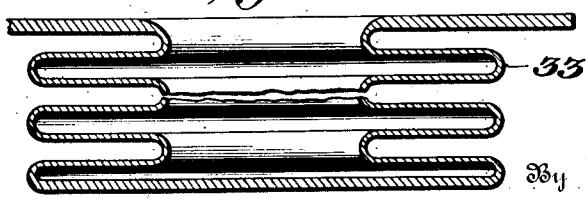
Inventor
Weston M. Fulton
By Mauro, Cameron, Lewis & Kerkam,
Attorneys Patented Oct. 18, 1932

1,882,798

UNITED STATES PATENT OFFICE

WESTON M. FULTON, OF KNOXVILLE, TENNESSEE, ASSIGNOR TO THE FULTON SYLPHON COMPANY, OF KNOXVILLE, TENNESSEE, A CORPORATION OF DELAWARE

MANUFACTURE OF TUBULAR CORRUGATED METAL WALLS

Original application filed January 14, 1922, Serial No. 529,282. Divided and this application filed January 14, 1924. Serial No. 686,187.

This invention relates to apparatus for displacing the grain in relatively-thin, tubular metal walls and particularly walls of this character which are to be subsequently provided with relatively deep corrugations to render the same axially flexible or expansible and collapsible.

An object of this invention is to provide apparatus which will so dispose the grain in a relatively-thin, tubular wall that, when subsequently corrugated to render the wall flexible in the direction of its axis, said wall will be capable of withstanding repeated flexure a great number of times without rupture of the wall.

Another object of this invention is to provide apparatus whereby the grain of the metal in a relatively-thin, tubular metal wall may be uniformly disposed at any desired angle to the axis of the wall, so that when said wall is subsequently corrugated to render the same flexible in the direction of its axis the direction of the grain may approximate the direction of the resultant of the strains in the wall existing by reason of the complex forces acting on the wall during expansion and contraction of the same.

Other objects of the invention will appear as the description of the invention proceeds.

The invention is capable of receiving a variety of mechanical expressions, one of which is shown on the accompanying drawing, but it is to be expressly understood that the drawing is for purposes of illustration only, and are not to be construed as a definition of the limits of the invention, reference being had to appended claims for that purpose.

Referring in detail to the drawing wherein the same reference characters are used to designate corresponding parts in the several figures, and wherein for the sake of clearness the tubular wall is shown as of a thickness disproportionate to its other dimensions,—

Fig. 1 is a fragmentary elevation, partly in section, of apparatus for displacing the grain in a relatively-thin, tubular metal wall and embodying the present invention;

Fig. 2 is an end elevation of the structure shown in Fig. 1;

Fig. 3 is a schematic view to illustrate the displacement of the grain; and

Fig. 4 is a diagrammatic view of a completed corrugated flexible tubular wall broken away at its central portion.

In accordance with the present invention, a relatively-thin tubular blank 9 is formed in any suitable way, as by extrusion, drawing, combined extrusion and drawing etc., and of any suitable metal, size and dimensions. The grain of the metal in this relatively-thin tubular blank may extend parallel to the axis of the wall or it may lie at various angles to the axis depending upon the method of manufacture employed in producing said wall, but as pointed out in my prior Patents No. 1,049,572, dated Jan. 7, 1913, and No. 967,010, dated August 9, 1910, it is desirable to have the grain of the metal disposed at such an angle to the axis of the wall that when the wall is subsequently provided with relatively deep corrugations to render the same flexible in the direction of its axis the greatest strength of the metal approximates in direction the resultant of the forces to which the metal is subjected when the wall is in use; moreover, it is desirable to have the grain of the metal uniformly disposed at substantially the same angle throughout the cylindrical wall. In conformity with the present invention the relatively-thin, tubular blank 9 is subjected to a treatment whereby the grain is displaced angularly of the axis of the tube throughout the extent of the tubular wall, the angularity to which the grain is displaced being selected to approximate the direction of the resultant of the strains existing in the flexible corrugated wall when in service and preferably being uniform throughout the length and circumference of the tubular wall.

In the form shown, a press of any suitable construction is provided with a ram or punch holder 10 which is mounted for reciprocation in ways 11, reciprocation being effected in any suitable way as by a crank 12. Said ram or punch holder 10 is composed of two sections (see Fig. 2), a main recessed body portion 13 and a recessed cover portion 14 which may be secured to the body portion 13 in any suitable way, as by cap screws 15.

Mounted in the ram or punch holder 10 is a rotatable punch or mandrel holder 16 which is provided in the recess 17 with an enlarged portion 18 that carries, preferably integral therewith, a bevel gear 19. Projecting beyond the bevel gear 19 is an extension 20 of reduced diameter which is received within and centered by a cylindrical recess 21 communicating with the main recess 17, said recess 21 constituting a bearing for the reduced end of the rotatable punch or mandrel holder 16. A ball bearing 22 of any suitable construction is also preferably interposed as a thrust bearing between the bevel gear 19 and the end of the recess 17. Meshing with the bevel gear 19 is a second bevel gear 23 on a short stub shaft 24 which projects laterally of the ram or punch holder 10 and carries at its outer end a small pinion 25 which meshes with a rack 26 provided in any suitable way on one of the ways 11. The end of the punch or mandrel holder 16 which projects outwardly from the ram 10 is suitably constructed for attachment thereto of a drawing punch or mandrel. In the form shown, the holder 16 is provided with a threaded recess 27 to receive the threaded end of the punch or mandrel 28, a screw 29 being shown for securing the mandrel fixedly within its holder. Mounted on the bed 30 of the press is a drawing die 31 of any suitable construction and in alignment with the path of reciprocation of the mandrel 28.

The tubular blank 9, which should be of a thickness slightly in excess of that desired for the finished wall in which the relatively deep corrugations are to be formed, is mounted on the mandrel or punch 28 when the ram or punch holder 10 is in its upper position, and the press is then started to lower the ram and force the blank 9 on the mandrel 28 through the die 31. As the ram descends, the pinion 25 by coaction with the rack 26 rotates the stub shaft 24, whereby the bevel gear 23 rotates the bevel gear 19 and the holded 16 secured thereto. Therefore, the mandrel 28, together with the blank 9 supported thereon, is rotated at the same time that it is moved longitudinally, so that relative rotation is maintained between the blank and the die at the same time that the blank and die are moved axially with respect to each other. The thickness of the tubular wall of the blank is thereby slightly reduced while, at the same time, the metal in said tubular wall is displaced angularly so that the grain of the metal is disposed helically as shown diagrammatically by the dotted lines 32 in Fig. 3.

When the blank has been passed through the die 31 it may be removed from the mandrel 28 so as not to be subjected to the action of the die as the mandrel is rotated reversely and withdrawn through the same, or any suitable means may be interposed in the train of gearing for rotating the holder 16 so that said holder is not rotated during the withdrawal of the mandrel from the die.

By suitably proportioning the gearing in the train for rotating the mandrel 28, the extent to which the blank is rotated as it is moved through the die 31 may be such as to so displace the grain of the tubular wall that said grain will lie at the desired angle to the axis of the wall, whereby it will approximate in direction the direction of the resultant of the forces to which the wall, when rendered flexible by the formation of relatively deep corrugations therein, is subjected when in use—an angularity which will vary in accordance with the different uses to which a wall of this character is applied.

It will therefore be perceived that the grain is uniformly displaced through the length and circumference of the tube so that it lies at the same angle to the axis of the tube throughout the tubular wall. Therefore a tube treated in the apparatus of the present invention possesses a marked advantage over a tube as produced by the method disclosed in my Patent No. 1,049,572 above referred to, because in the latter tube the grain lies parallel to the axis of the tube along two lines diametrically disposed with respect to each other, while in the neighborhood of these lines the angularity of the grain with respect to the axis is relatively small, and gradually increases to lines 90° removed from the aforesaid lines. The present apparatus, on the other hand, displaces the grain at a substantially uniform angle throughout the tubular wall of the blank, and this angularity of the grain can be controlled by proportioning the extent of rotation to the extent of longitudinal movement of the blank so that the direction of the maximum strength of the metal in the resulting corrugated flexible wall may approximate the direction of the resultant of the strains existing in the wall.

The relatively thin wall with its grain displaced angularly of the axis of the tube in the manner explained is then provided with relatively deep corrugations to render the same flexible in the direction of its axis. The corrugating operation may be carried out in any suitable way, as by the method disclosed in my prior Patent No. 971,838, dated Oct. 4, 1910, or by the method disclosed in the application filed by Jean V. Giesler and myself, Ser. No. 390,981, dated June 22, 1920. Such a flexible corrugated tubular wall is diagrammatically illustrated at 33 in Fig. 4.

While one embodiment of the present invention has been described and illustrated with considerable particularity, it is to be expressly understood that the invention is not restricted thereto, as the same is capable of receiving a variety of expressions, some of which will now suggest themselves to those skilled in the art, while changes may be made in the details of construction, proportion and arrangement of parts, the die may be rotated or reciprocated, or both, with respect to the mandrel etc., without departing from the spirit of the present invention. Reference is therefore to be had to the appended claims for a definition of the limits of the invention.

This application is a division of my application Serial No. 529,282, filed Jan. 14, 1922, entitled "Flexible corrugated tubular walls and methods and apparatus for making the same."

What is claimed is:—

1. Apparatus for displacing the grain in a relatively thin tubular wall including a die of only slightly less diameter than the tube to be operated upon, a mandrel, means for moving said mandrel through said die to operate upon said wall, a stationary rack, and gearing movable with said mandrel and cooperating with said rack to rotate said mandrel as it moves through said die.

2. Apparatus for displacing the grain in a relatively-thin tubular wall including a mandrel for carrying said wall, a die, means for producing relative axial movement of said wall and said die to operate upon said wall, a rack, and gearing cooperating with said rack and actuated by said axial movement for producing relative rotational movement of said wall and said die.

3. Apparatus for displacing the grain in a relatively thin tubular wall including a stationary die, a mandrel, means for pushing said mandrel through said die to operate upon said wall, a gear on said mandrel, and means cooperating with said gear on said mandred and including means on a stationary part of said apparatus for rotating said mandrel as said mandrel is displaced axially to push said tube through said die.

4. Apparatus for displacing the grain in a relatively thin tubular wall including a stationary die, a mandrel, means for pushing said mandrel through said die to operate upon said wall a gear on said mandrel, and reducing gearing cooperating with said gear on said mandrel and including means on a stationary part of said apparatus for rotating said mandrel as said mandrel is displaced axially to push said tube through said die.

In testimony whereof I have signed this specification.

WESTON M. FULTON.